Aug. 28, 1956

C. W. ADAMS ET AL 2,760,269

ARTIFICIAL TEETH SELECTION RIM

Filed Jan. 21, 1954

*INVENTOR.*
CLAUDE W. ADAMS
JOHN E. WATSON
BY

*ATTORNEY*

United States Patent Office 2,760,269
Patented Aug. 28, 1956

2,760,269

ARTIFICIAL TEETH SELECTION RIM

Claude W. Adams and John E. Watson, York, Pa., assignors to The Dentists' Supply Company of New York, York, Pa., a corporation of New York Application January 21, 1954, Serial No. 405,362

2 Claims. (Cl. 32—71)

This invention relates to a selection rim and kit for aiding in the demonstration and selection of artificial teeth for a denture, usually prior to the making of the denture for an individual patient. The average edentulous patient is quite sensitive about the appearance of a denture in the mouth and a dentist is able to ease the patient's anxiety by demonstrating the appearance of the artificial teeth as they will appear in a finished partial or complete denture prior to the same being processed and completed.

To aid in such demonstrations, dentists have used, for a considerable time, what is known in the profession as a selection rim. Such rim usually consists of a curved metallic member having an outline shape corresponding generally to the average labial portion of the upper gum of a normal patient, the curvature of the rim being fixed to conform generally to the natural curvature, from side to side, of the portion of the gum referred to. A handle is fixed to one end of the rim for purposes of holding the rim during the desired demonstration to the patient.

Suitable means, either mechanical or otherwise, are provided on the rim for purposes of temporarily holding artificial teeth thereon in positions similar to those which the teeth will occupy in a finished denture. After arranging the teeth on the rim, the rim is then held against the labial surface of the upper gum, for example, in order that the patient and dentist may visualize approximately the appearance of the artificial teeth in the patient's mouth when affixed to a finished denture.

In prosthetic dentistry, which deals with the formation of partial and complete dentures, the greatest care is exercised in selecting and arranging particularly the anterior or front teeth in a denture inasmuch as these teeth are the ones which usually are exposed to view when a denture is in use. Not only is it desirable to select artificial teeth which will have a shade or hue suitable to the patient but it also is highly essential that teeth of the proper size be used and the arrangement thereof be natural to any individual patient.

As far as is known, selector rims used up to the present time have had a fixed curvature which will correspond reasonably well to the gum curvature of an average patient but, in regard to a patient having a gum of short radius or a patient having a gum of large radius, the curvature of such a fixed selection rim does not correspond to the natural curvature of the gum. Further, these selection rims referred to usually are formed from material which imparts a cold feeling to the patient when placed against the gum and thus is uncomfortable.

The present invention obviates the above described difficulties and provides a selection rim which is capable of having the curvature thereof varied to make it correspond very closely to the natural curvature of any individual patient. Further, the selection rim is formed from a resinous material which does not impart a distinctly cold feeling to the patient when placed upon the gum.

In addition, the present invention utilizes a putty-like material which adheres adhesively to the selection rim and also permits temporary attachment of artificial teeth to the selection rim by adhesion as well as adjustment of said teeth relative to said rim. Said putty-like material preferably is tinted to resemble gum tissue and also is moldable readily on the selection rim, after the latter is adjusted to appropriate curvature for an individual patient, in order that said material may be worked over the gingival ends of the artificial teeth to obscure them and present a natural appearance of the teeth on the rim, resembling the artificial gum portion of a finished denture. Adjustment of the relative positions of artificial teeth on the selection rim is made until the desired arrangement of the teeth is achieved. This arrangement also may be copied when arranging the teeth on a model from which the completed denture is to be made.

Details of the invention and the objects thereof are set forth in the following specification and illustrated in the accompanying drawings comprising a part thereof.

In the drawings, Fig. 1 is a front elevation of a selection rim per se embodying the principles of the present invention.

Figure 1:
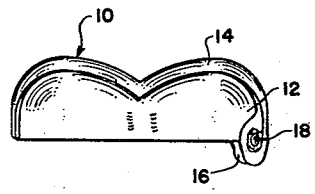
Figure 2:
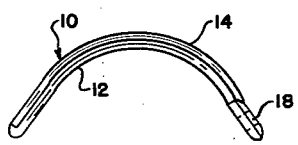
Fig. 2 is a top edge view of said selection rim.

Referring to the figures, and particularly Figs. 1 and 2, the selection rim 10 comprises a base member 12 which is shaped in outline generally to correspond to the shape of the labial portion of the upper gum of an average patient. The base member 12 also has a curvature similar to that shown in Fig. 2, this curvature also corresponding to the curvature of the outer surface of the labial portion of the upper gum of an average patient. The base member preferably is of substantially uniform thickness which by way of specific example is only about $\frac{1}{16}$ of an inch. The upper and side edges thereof are provided with a thicker rim 14 and an ear 16 is formed at one end to extend slightly below the lower edge of the rim 10 when in demonstrating position. Said ear 16 is provided with an aperture 18.

The base member 12, in its preferred embodiment, is formed by injection molding from a suitable resinous material so as to render said member pliable and somewhat rubbery when molded. Materials which have been found to be highly satisfactory for this purpose are polyethylene, injection type reaction products of an amine and an organic acid, one example of which is sold under the trade name "nylon," and plasticized vinylchloride. Other plastic materials of a pliable nature may be used if the same possess the property of being pliable so as readily to be bent or flexed and also are capable of maintaining the position to which they are bent for a limited period of time.

Figure 3:
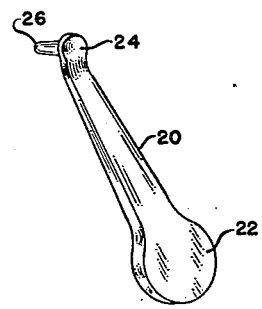
Fig. 3 is a perspective view of a handle to be used in conjunction with said selection rim.
Figure 5:
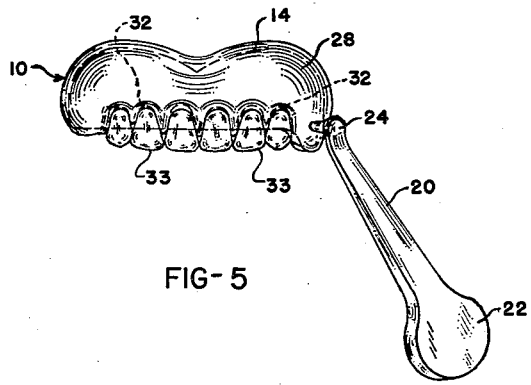
Fig. 5 is a front elevation of the selection rim of Figs. 1 and 2 shown in exemplary use with a set of six anterior artificial teeth positioned thereon as they will appear while being demonstrated to a patient.

As shown in Figs. 3 and 5 particularly, the selection rim 10 is provided with a handle 20. For purposes particularly of esthetics and low cost of manufacture, said handle is formed preferably by molding from suitable resinous material which is relatively rigid when cured, such as methyl or ethyl methacrylate. Other synthetic resins are suitable for this purpose however if they are as compatible as acrylics with the materials of base member 12 so as not to cause crazing or other undesirable results. One end of the handle 20 is provided with an enlarged finger engaging end 22, while the other end 24 preferably is bent at a slight angle to the handle 20 and a projecting tapered lug 26 is formed integrally thereon. The tapered lug 26 is frictionally receivable within the aperture 18 of the selection rim 10 to effect a firm connection of the handle 20 and base member 12. The handle 20 may be disposed at any angle of adjustment desired relative to said rim by rotating the handle about the axis of lug 26.

Figure 4:
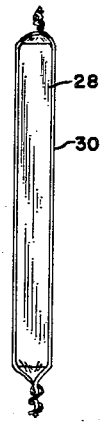
Fig. 4 is a side elevation of an exemplary stick of putty-like material for use with the selection rim, said stick being shown wrapped in sanitary condition.

Sticks or other preferably elongated forms of plastic putty-like material 28 are provided as shown in Fig. 4, these being enclosed in a suitable sanitary wrapper 30 which may be cellulose sheeting or otherwise. Said material is such as to be at least temporarily adhesively attachable to the front surface of the base member 12 of the selection rim. The stick 28 is readily moldable and deformable, especially from the natural heat of the fingers of a dentist, so that it may be formed more or less into an elongated sheet and disposed on the base member 12 and adhesively attached thereto. The material 28 must not only be adhesive relative to the base member 12 but also relative to both porcelain and resinous artificial teeth, yet be separated relatively cleanly therefrom. One material which has been found suitable is a mixture of polyvinyl chloride and a plasticizer. The portion of the sheet of material 28 adjacent the rim 14 of the base member preferably is arranged so as to be thicker than the other portions of the sheet of material 28 when attached to said base member. For esthetic purposes particularly, the material 28 is tinted to resemble the natural appearance of a gum similarly to the material from which the base member 12 is formed in its preferred embodiment.

The selection rim now is in condition with the material 28 thereon to have artificial teeth applied temporarily thereto and arranged so as to be harmonious to the appearance of the patient. For example, if the natural teeth of a patient recently have been extracted and such natural teeth were arranged in the gum in slight mis-alignment, if the artificial teeth are similarly arranged, the possibility of detecting that the patient is wearing a denture is least possible. However, the final arrangement of the artificial teeth is a matter of choice to be made by the patient and the arrangement of the teeth positioned on the selection rim and material 28 may be varied until a desired complete arrangement of the teeth is achieved to please the patient.

The thicker upper portion of the material 28, referred to above, adjacent rim 14 then may be molded and moved to cover the gingival ends 32 of the artificial teeth 33 as shown in dotted lines in Fig. 5. Such gingival ends 32 are embedded in the denture base material of a finished denture and, by covering these ends with the material 28, a natural appearance of the artificial teeth on the selection rim is achieved.

Figure 6:
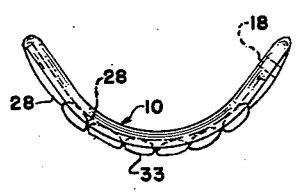
Fig. 6 is a top plan view of the selection rim shown in Fig. 5 with the curvature thereof disposed on a relatively short radius.
Figure 7:
Fig. 7 is a very similar view to Fig. 6 but showing the curvature disposed on a relatively long radius.

If the patient has a gum of short radius and relatively sharp curvature, the pliable selection rim 10 may be bent by the dentist and suitably curved to correspond closely to the natural labial portion of the patient's gum. Such a sharp curvature on a relatively short radius is illustrated in Fig. 6. However, if the patient happens to be a large person or otherwise has a widely curved gum of relatively long radius, the selection rim may be bent to decrease the original curvature thereof so as to dispose the rim into a curved configuration conforming closely to the labial portion of that particular patient's gum. Such curvature is illustrated in an exemplary manner in Fig. 7. Thus, the present selection rim substantially is universally adaptable to any curvature of gum existing in any individual patient and therein it materially distinguishes over any previously known selection rim.

The base member 12 is capable of repeated flexings without fracture. Also, the layer 38 aids in maintaining the desired curvature of said base member 12. In addition, the class of resinous materials from which the selection rim is formed contributes to the comfort of the patient during the selection process by no substantial shock being experienced when the selection rim 10 is placed against the natural gum. In this respect, the present invention also differs from and comprises a marked improvement over previously used metallic selection rims.

The selection rim components and a supply of wrapped sticks of material 28 may be conveniently packaged in a suitable kit or box to facilitate merchandising and use of the same.

While the invention has been shown and illustrated in its preferred embodiment, and has included certain details, it should be understood that the invention is not to be limited to the precise details herein illustrated and described since the same may be carried out in other ways falling within the scope of the invention as claimed.

We claim:

1. A selection rim for artificial teeth comprising a body member shaped to correspond to the labial portion of a natural gum and initially curved a predetermined amount to correspond to the curvature of a typical labial gum portion, said body member being formed from pliable synthetic resin of the group consisting of polyethylene, a plasticized reaction product of an amine and an organic acid, and plasticized vinyl-chloride, and capable of being bent to assume and retain for at least a limited time a curvature different from said initial curvature for purposes of closely conforming said body to the curvature of the labial gum portion of any individual patient, and a layer of plastic material having tacky characteristics attachable to the outer surface of said body member and capable of having artificial teeth attached temporarily thereto for purposes of holding said teeth on said body member for displaying and pre-viewing said teeth in the patient's mouth substantially as they would appear in a denture.

2. The selection rim set forth in claim 1 further including a handle member attachable at one end to one end portion of said body member and characterized by one of said members having an aperture extending transversely through one end portion thereof and the other member having a tapered lug with smooth walls projecting substantially perpendicularly from one end thereof and frictionally receivable within said aperture in the other member to connect said members detachably and adjustably.

References Cited in the file of this patent

UNITED STATES PATENTS

| 2,249,634 | Myerson | July 15, 1941 |
| 2,341,153 | Myerson | Feb. 8, 1944 |
| 2,343,777 | Lays | Mar. 7, 1944 |